July 1, 1969  J. D. LOVE ET AL  3,453,018
TOBACCO HARVESTING MACHINE
Filed Feb. 8, 1967
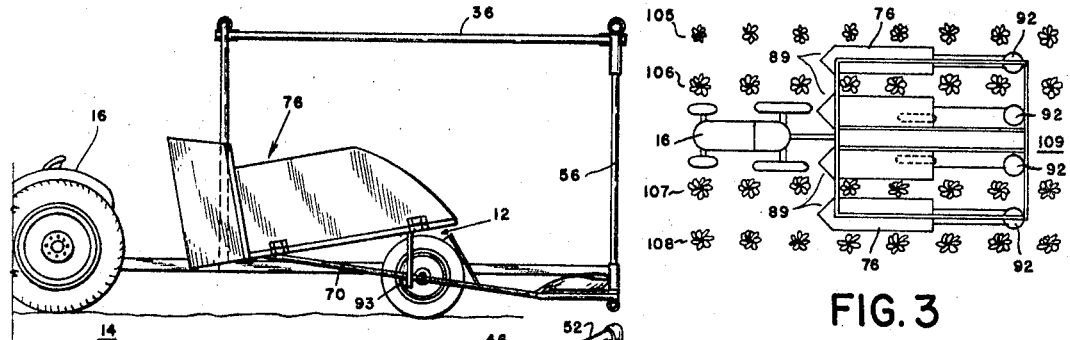
FIG. 2
FIG. 3
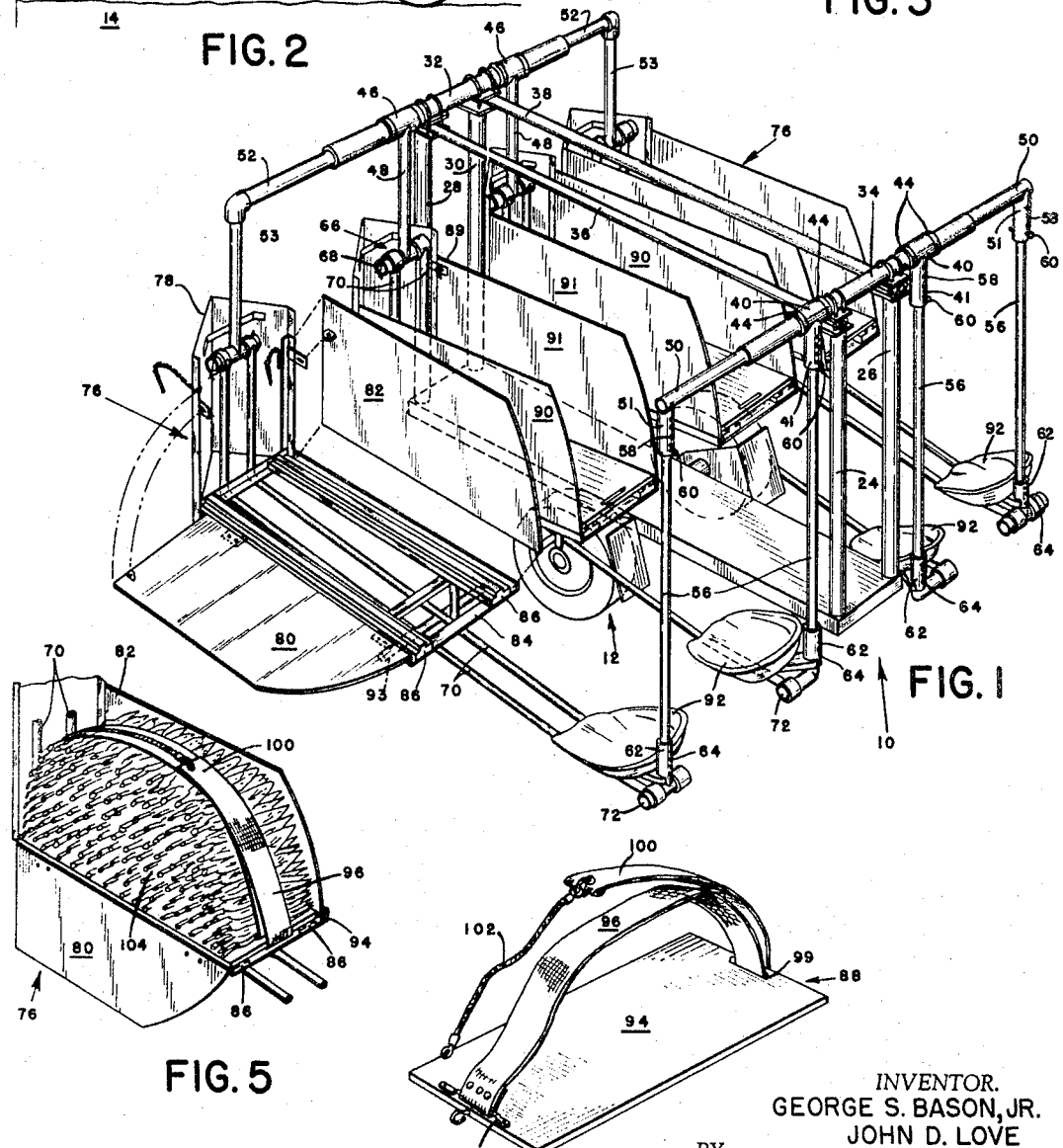
FIG. 1
FIG. 5
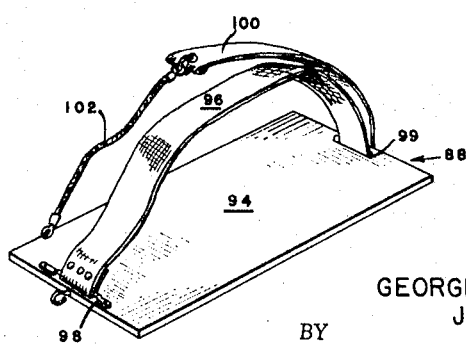
FIG. 4
INVENTOR.
GEORGE S. BASON, JR.
JOHN D. LOVE
BY United States Patent Office 3,453,018
Patented July 1, 1969

3,453,018
TOBACCO HARVESTING MACHINE
John D. Love and George S. Bason, Jr., Reidsville, N.C., assignors to Love Tractor Sales, Inc., Reidsville, N.C., a corporation of North Carolina
Filed Feb. 8, 1967, Ser. No. 614,708
Int. Cl. B60p *1/00;* A24b *1/06;* A01d *45/16*
U.S. Cl. 296—5                              6 Claims

ABSTRACT OF THE DISCLOSURE

This invention relates generally to a new and useful apparatus for harvesting tobacco and relates more particularly to a tobacco harvesting apparatus which is adapted for attachment to and movement with a self-propelling power unit and which has a plurality of leaf-collecting bins and operator seats that are swingably and laterally movable to avoid damage to the apparatus due to jolts and strains when it is used on irregular terrain or when stumps, rocks and the like are encountered.

BRIEF SUMMARY OF THE INVENTION

A number of prior are devices have been constructed and used to harvest tobacco, but for the most part, these devices are rather elaborate, most often self-propelled and extremely expensive harvesters thus placing them beyond the economic means of the average tobacco farmer. The present invention is adapted to be attached to a tractor or the like and towed through a tobacco field and is of an extremely simple construction and relatively inexpensive by comparison. Additionally, the invention is supported by a pair of conventional trailer wheels and contains a substantially horizontal flat frame member to which is attached upstanding support struts that suspend and retain the superstructure a suitable distance above the ground. Atop and bridging these upstanding struts are overhead support members from which the additional structural components are suspended. A number of bin and seat carrying assemblies hang downwardly from the overhead support members and are swingable to and fro and function to eliminate any structural rigidity which could damage the apparatus should irregular terrain or stumps and the like be encountered. A unique telescoping arrangement provides an additional adjustability feature and allows the carrying assemblies to move to and from each other when terrain or encountered obstructions jolt or strain the apparatus superstructure.

A partially enclosed bin with removable side walls is carried by each bin and seat support, and this bin is adapted to house a plurality of pallets, each having an adjustable securing strap attached thereto to retain tobacco leaves which have been stacked thereon after removal from the bin.

The present apparatus is operated by positioning a rider rearwardly of one of the bins on an adjustable seat corresponding to the particular bin, both of which are secured to the carrying assemblies so that leaves may be picked from tobacco plants and placed in substantial alignment on the pallet inside the bin. Any number of riders may be accommodated, and the harvesting apparatus then floats to a certain extent when obstructions or rough terrain are encountered so that no damage to the machine results because of a rigid construction.

Since presently used tobacco harvesters are very susceptible to damage from shock and strain as a result of rigid superstructure construction, it is among the objects of our invention to provide an apparatus for harvesting tobacco that is shiftable and adjustable in response to vibrations, jolts and strains caused by irregular terrain or obstructions encountered while the apparatus is in use.

Another object of the present invention is to provide an apparatus for harvesting tobacco that utilizes a plurality of stackable, leaf-retaining pallets having securing means adjustably fastened thereto which can be removed from the harvester as they are filled with tobacco without machine interruption.

Still another object of the present invention is to provide an apparatus for harvesting tobacco that can be constructed to harvest a number of tobacco rows simultaneously by varying the number of riders carried thereby.

Yet another object of the present invention is to provide an apparatus for harvesting tobacco that is extremely simple in construction, readily accessible for maintenance, and economical in cost as compared to conventional harvester units.

Yet still another object of the present invention is to provide alternative embodiments of the above-described tobacco harvesting apparatus that will be suited for a particular application or field arrangement under existing circumstances.

These and other objects of the present invention will become apparent from a consideration of the accompanying drawings constituting a part hereof in which like characters of reference designate like parts.

BRIEF FIGURE DESCRIPTION

FIG. 1 is a perspective, partially dismantled view of the tobacco harvesting apparatus constituting the preferred embodiment of the present invention.

FIG. 2 is a side elevational, somewhat diminished view of a tobacco harvesting apparatus showing its securement to a self-propelling power unit.

FIG. 3 is a top plan, still further diminished view of a tobacco harvesting apparatus embodying the present invention as it is towed thorugh a particularly arranged tobacco field by a self-propelled power unit.

FIG. 4 is a perspective, isolated view of a pallet used within the bins of the present tobacco harvesting apparatus showing the securing strap in an unfastened position.

FIG. 5 is a perspective, fragmentary and partially disassembled view of the pallet of FIG. 4 retained in a bin of the harvesting apparatus illustrated in FIG. 1 showing the pallet filled with collected and aligned tobacco leaves and retained by the adjustable securing strap.

DETAILED DESCRIPTION

Referring now to the drawings and particularly to FIG. 1, a frame generally designated 10 is supported in a substantially horizontal position by a wheel and axle assembly generally indicated 12 so that the harvesting apparatus can be transported a fixed and suitable distance above the ground 14 when it is connected to a self-propelled power unit such as the tractor shown in FIG. 2 and designated 16. A tongue 18 extends from the forward end 20 of frame 10 and attaches to the pulling unit by a latch 22 or the like.

A number of upstanding support members 24, 26, 28 and 30 extend from frame 10 upwardly to serve as a base for a pair of horizontally disposed and transversely extending overhead support members 32 and 34, member 32 bridging upstanding support members 28 and 30 and member 34 bridging members 24 and 26. Members 32 and 34 extend outwardly from either side of their supports, and a pair of longitudinally disposed connecting members 36 and 38 also extend between and bridge the upstanding support members, member 36 joining members 24 and 28 and member 38 joining members 26 and 30.

The flexibility of the present invention is best illustrated in FIG. 1. A number of T-shaped sleeves 40 are swingably attached to member 34 so that the legs 41 extend downwardly and are free to pivot about member 34 restricted only by ring clamps 44 adjacent to sleeves 40 which function to preclude lateral movement of the sleeves on member 34. At the forward end of frame 10, additional sleeves 46 are pivotally secured about member 32, these sleeves having an elongated neck 48 to permit a unique fastening to structural components later to be described.

Horizontal tubular members 50 having depending legs 51 telescope within member 34 above the rearward end of frame 10 and are frictionally held therein so that any jolt or shock experienced by the entire frame structure will cause members 50 to telescope within member 34 to obviate the stresses and avoid any damage to the frame. Members 50 may rotate within member 34 being restrained only by the frictional characteristics of the telescoping arrangement and cooperate with other components to form carrying assemblies which will be subsequently described. Above the front end of frame 10, horizontal tubular members 52 having legs 53 telescope within member 32 and are frictionally held therein to the extent as previously described for the rear portion of the frame.

Over the rearward portion of frame 10, members 50 and sleeves 40 carry depending rods 56 which form one supporting end for the suspended components below and assume selected lengths because of apertures 58 and cooperating pins 60. Similar adjustments are available at the lower end of member 56 because of various configurations of perforated sleeves 62 having cooperating pins 64.

The forward portion of the harvester which is supported essentially by memebrs 48 and 53, is comprised of a number of yokes generally designated 66 which are pivotal at member 68, substantially parallel struts 70 being positioned to move in unison thereabout. Struts 70 are bent at an angle (see FIG. 2) somewhat larger than 90 degrees and extend rearwardly to connect in pairs with individual sleeves 62 secured to depending members 56. Pivotal movement occurs about members 72.

Thus depending mmebers 41, 48, 51 and 53 and their carried members form a plurality of carrying assemblies for sustaining the various other components now to be described.

An outside bin generally designated 76 is removably constructed atop struts 70 and comprised of a front projecting shield 78, a downwardly foldable side member 80, and a detachable inner side member 82. Additionally, a bottom member 84 provides the floor within the bin for supporting a pair of parallel runners or skids 86 adapted to accept smoothly one or more pallets 88 later to be described. For convenience, the outside bins of the harvester have one foldable wall and one removable wall as had been described, while the inner bins, such as designated 89, contain all removable walls 90 and 91 for easy access to their interiors.

A seat 92 is positioned near the rear of each pair of struts 70 proximate depending member 56. A foot rest 93 is secured to the lower portion of each pair of struts 70 so that the operator may be comfortably seated at the rear and open portion of bins 76 or 89.

Note that bins 76 and 80 secured to the harvester are inclined so that the front and closed ends are at lower elevations than the rear and open ends into which tobacco leaves are inserted. This inclined positioning allows the operator easier loading of leaves and retains the pallets 88 which are are stacked therein against inadvertent removal due to shocks or jolts.

Pallet 88 is essentially a rectangularly shaped flat planar members such as a board 94 which has an adjustable strap 96, one end of which is affixed to a retaining clamp 98 positioned at one end of the board 94. A groove 99 in the other end of board 94 accommodates the strap and allows the extending end 100 to double back toward clamp 98. An elastic securing strand 102 attaches to extending end 102 and will then stretchably extend to fasten at clamp 98 or hooking means 104 to secure any size load carried by the board 94 of pallet 88.

The loading of the pallet 88 is best illustrated in FIG. 5 where it is shown positioned on skids 86 of a bin 76 supporting a plurality of tobacco leaves 104 arranged in substantial butt-end alignment, which arrangement was accomplished by abutting the leaf butts against sidewall 80 secured in place during the loading operation. Note that pallet 88 and its strap-secured load can be quickly slid out of the bin through the rear and open end and deposited on the ground for collectors to pick up and move to a remote location.

As a tractor or similar vehicle pulls the harvesting apparatus through the tobacco field (see FIG. 3), each picker carried passes a single row 105, 106, 107 or 108 of tobacco plants so that he might strip ripened leaves from each tobacco stalk in that row as the vehicle moves relative thereto. It is important that tobacco fields are planted in the configuration shown in FIG. 3 which involves leaving every fifth row 109 open to accommodate a tractor and towed harvesting apparatus through the field.

Thus the harvester described above is uniquely adapted to sustain jolts and shocks resulting from rough terrain covered with rocks, stumps or the like because of its swingability, adjustability and shiftability, these being the result of the pivotal and telescoping nature of the frame members comprising the superstructure. The telescoping of members 50 and 52 into overhead support members 32 and 34 is also effective to reduce the device to the smallest possible width so that it might be easily transported over roads, highways, and the like.

It is readily apparent that the capacity of the presently described harvester can be increased or decreased without losing the effectiveness of the shiftability and swingability features found herein, and it is equally within reason to consider that the unit itself can be made into a self-propelled device by the construction of the above-described superstructure about a tractor or similar device.

Unquestionably, many modifications and variations may be made in the construction of the frame, upstanding support members, overhead support members, bins and pallets as well as other phases of the present inventive concept in light of the above teachings without departing from the real spirit and purpose of the invention. Such modifications of parts as well as the use of mechanical equivalents to those herein illustrated and described are reasonably included and contemplated.

What is claimed is:

1. A tobacco harvesting apparatus adapted for attachment to and movement with a self-propelling power unit comprising: a frame; upstanding support means carried by said frame; overhead support means bridging said upstanding support means and sustained thereby; a plurality of bin and seat-carrying assemblies swingably suspended from said overhead support means, said assemblies being movable laterally each with respect to the other; a bin having a forward and rearward end carried by each of said assemblies; and at least one pallet removably carried by said bin, said pallet having adjustable means for retaining tobacco leaves stacked thereon, said bin including a projecting shield at said forward end, at least one removable side partially enclosing said bin, a bottom, and a pair of parallel skids contiguous with said bottom, said bin inclined so that said forward end is at a lower elevation than said rearward end and tobacco leaves placed on said bottom will have a tendency to move toward the forward end.

2. A tobacco harvesting apparatus as claimed in claim 1 further comprising an adjustable seat carried by each of said assemblies.

3. A tobacco harvesting apparatus as claimed in claim 1, each of said assemblies including downwardly extending members pivotally connected to said overhead support means and bin and seat sustaining struts connected to said members to provide a swingable support carrier for said bin and seats, each carrier adapted to shift laterally with respect to an adjacent carrier.

4. A tobacco harvesting apparatus as claimed in claim 1, said pallet comprising a flat planar member of a size convenient to be stacked in numbers within said bin and having a strap-receiving slot at one end and strap-retaining clamp at the other, said leaf-retaining means including a strap affixed to said retaining clamp and extending longitudinally above said planar member through said slot and back again, and an elastic securing strand attached to the extending end of said strap, said strand stretchably reaching to the strap retaining clamp for securement thereto to tension the strap and strand about tobacco positioned thereon.

5. A tobacco harvesting apparatus as claimed in claim 1, each of said assemblies including downwardly extending members pivotally connected to said overhead support means and bin and seat-sustaining struts connected to said members to provide a swingable support carrier for said bin and seat, each carrier adapted to shift laterally with respect to an adjacent carrier.

6. A tobacco harvesting apparatus as claimed in claim 2, said seat including elevation adjusting means, horizontal adjusting means and a foot rest cooperating therewith, said pallet slidably positioned in said bin on said skids and generally retained therein by the forwardly inclined disposition of said bin.

References Cited

UNITED STATES PATENTS

| | | | |
|---|---|---|---|
| 3,107,018 | 10/1963 | Mish | 214—83.1 |
| 3,095,230 | 6/1963 | Long | 296—5 |
| 3,215,288 | 11/1965 | Long | 214—5.5 |

PHILIP GOODMAN, *Primary Examiner.*

U.S. Cl. X.R.

56—27.5; 214—5.5, 83.1